United States Patent [19]

Shea et al.

[11] Patent Number: 4,951,015

[45] Date of Patent: Aug. 21, 1990

[54] CIRCUIT BREAKER WITH MOVING MAGNETIC CORE FOR LOW CURRENT MAGNETIC TRIP

[75] Inventors: John J. Shea, Monroeville; Richard P. Sabol, Munhall; Ronald A. Cheski, Stowe Township, Allegheny County, all of Pa.

[73] Assignee: Westinghouse Electric Corp., Pittsburgh, Pa.

[21] Appl. No.: 417,378

[22] Filed: Oct. 5, 1989

[51] Int. Cl.[5] .......... H01M 75/10

[52] U.S. Cl. .......... 335/38; 335/42

[58] Field of Search .......... 335/38–45, 335/236–237, 162–163, 172, 176

[56] References Cited

U.S. PATENT DOCUMENTS 3,815,059 6/1974 Spoelman .......... 335/16

4,719,438 1/1988 Mrenna et al. .......... 335/42

*Primary Examiner*—Leo P. Picard

*Assistant Examiner*—Lincoln Donovan

*Attorney, Agent, or Firm*—M. J. Moran

[57] ABSTRACT

A circuit breaker is disclosed having a movable magnetic core provided in the magnetic trip assembly thereof adapted to lower the current levels at which the magnetic trip mechanism will operate. The magnetic trip assembly also includes a pivotally connected armature, a current carrying conductor, a fixed magnetic yoke and a latchable operating mechanism. A primary air gap exists between the armature and the fixed yoke. The movable core is designed to move into an extended position which reduces the primary air gap which in turn increases magnetic flux coupling which allows the magnetic force required for the armature to pivotally rotate to unlatch the operating mechanism and thereby trip the circuit breaker to be generated at a lower current level. This reduction in current is the desired effect of the new design.

14 Claims, 5 Drawing Sheets

CIRCUIT BREAKER WITH MOVING MAGNETIC CORE FOR LOW CURRENT MAGNETIC TRIP

BACKGROUND OF THE INVENTION

1. Field of the Invention

This invention relates generally to circuit breakers having a magnetic trip assembly in which the magnetic field induced by an abnormal current unlatches a latchable operating mechanism to trip the breaker, and more particularly to such a magnetic trip assembly which includes a supplemental magnetic core which allows the magnetic trip assembly to trip the breaker at relatively low levels of overcurrent.

2. Background Information

Circuit breakers provide protection for electrical systems from electrical fault conditions such as current overloads and short circuits. A common type of circuit breaker used to interrupt abnormal conditions in an electrical system incorporates a thermal trip device which responds to persistent low levels of overcurrent and a magnetic trip assembly which responds to higher levels of overcurrent in a fraction of a second. An example of such a circuit breaker is disclosed in U.S. Pat. No. 4,528,531. In such circuit breakers, the thermal trip device comprises a bimetal which bends in response to the persistent low level overcurrent passed through it to unlatch a latchable operating mechanism. The latchable operating mechanism is spring operated to open electrical contacts which interrupt the current. The magnetic trip assembly includes an armature which is spring biased to latch the operating mechanism. The current through the bimetal produces a magnetic field which is concentrated by a magnetic yoke to attract the armature and unlatch the operating mechanism at a specified level of overcurrent. The bimetal in these circuit breakers acts as a one turn electromagnet for the magnetic trip assembly.

Such circuit breakers have been in use for many years and their design has been refined to provide an effective, reliable circuit breaker which can be easily and economically manufactured on a large scale.

Recently there has developed a market for such circuit breakers with a magnetic trip assembly which operates at lower levels of instantaneous overcurrent. The level of overcurrent at which the magnetic trip operates is a function of several factors, including the friction force on the spring operated latchable operating mechanism, the spring constant of the spring biasing the armature to latch the operating mechanism, the magnitude of the magnetic field produced by the overcurrent and the coupling of the magnetic field to the armature.

In previous designs, the magnetic trip mechanism would operate at generally fifteen times (15X) the breaker rating. More recently, the market has demanded breakers which have a magnetic trip rating in the range of 5X to 10X. However, to the present, a device has not been developed which is readily adaptable to existing breaker designs.

There remains a need for an improved circuit breaker with a magnetic trip assembly for use in a multiphase system which becomes operative at lower current levels for example, having a rating of 5–10X, but which can also be adapted for use in a single phase breaker.

There is a further need for such a circuit breaker which can be produced economically.

There is a related need for a circuit breaker with a low magnetic trip which requires little modification to the existing single phase and multiphase circuit breaker designs.

SUMMARY OF THE INVENTION

These and other needs are satisfied by the present invention which is directed to a circuit breaker having a magnetic trip assembly including a movable magnetic core which is used in addition to a fixed magnetic yoke to supplement and increase the sensitivity of the magnetic trip assembly. The magnetic trip assembly includes an armature which latches a latchable operating mechanism to maintain electrical contacts contained in the circuit breaker in a closed position. The armature is pivotally connected at its lower end and has a free end which is biased away from the fixed magnetic yoke. An air gap is defined between the armature and the fixed magnetic yoke.

The fixed magnetic yoke surrounds a conductive member. The yoke is U-shaped and has legs extending outwardly on opposite sides of the conductive member into the air gap. The yoke concentrates the magnetic flux in the direction of the armature.

A magnetic circuit is formed around the current carrying conductor, through the magnetic yoke, the armature and the air gap therebetween. The magnetic force drawing the armature towards the yoke varies inversely with the square of the length of the air gap. Since magnetic force is proportional to the square of the current, this results in the trip mechanism operating at lower currents than otherwise.

The invention is directed towards lessening the air gap and increasing concentration of flux thereby generating the same magnetic force at lower current levels, at which the armature will unlatch the operating mechanism. The invention provides a U-shaped moving magnetic core which is placed adjacent the fixed yoke and which is mounted in such a way that it travels within the magnetic trip assembly between an extended and a retracted position. In the extended position, the legs of the U-shaped core extend into the air gap beyond the legs of the fixed yoke, thereby shortening the air gap, and as well, further concentrating the magnetic flux which in turn lowers the current required to overcome the biasing and attract the armature towards the fixed yoke to its unlatched position.

Preferably, the moving core is mounted such that it fits inside and is surrounded by the U-shaped fixed yoke. When current flows though the conductive member, an attraction occurs between the core and the armature; the core is drawn out of the yoke to its extended position, reducing the air gap between the armature and the core. The armature continues to be drawn back towards the yoke and it comes in contact with the core and then drives the core back inside the yoke; this results in the full armature travel required to unlatch the operating mechanism and rotate the trip bar. The moving core aides in attracting the armature to the magnetic yoke and does so at lower current levels than would be necessary without the movable core.

BRIEF DESCRIPTION OF THE DRAWINGS

A full understanding of the invention can be gained from the following description of the preferred embodiment when read in conjunction with the accompanying drawings in which.

DESCRIPTION OF THE PREFERRED EMBODIMENTS

Figure 1:
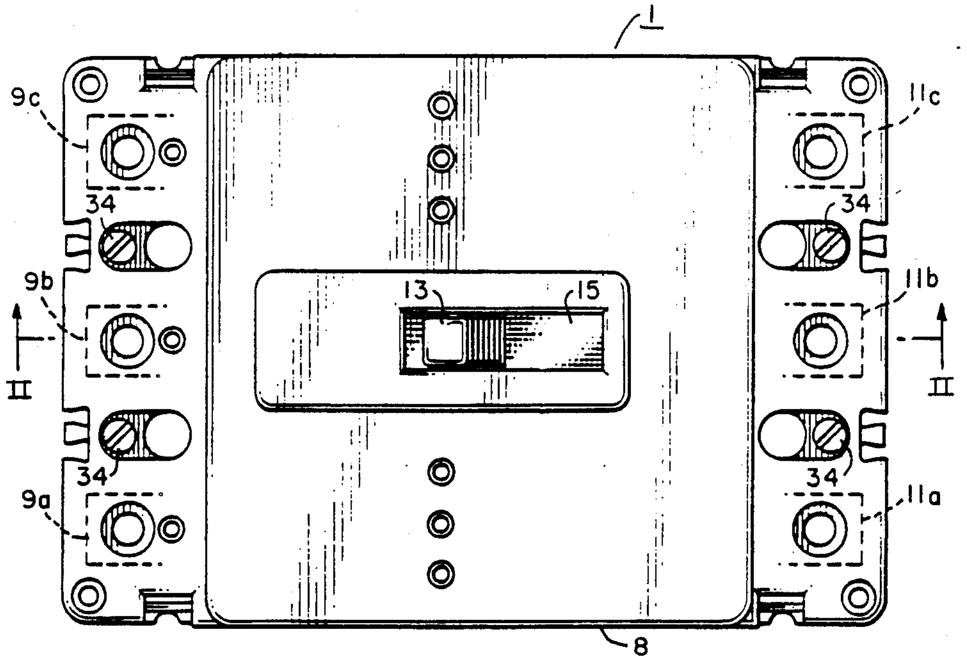
FIG. 1 is a top plan view of a molded case circuit breaker incorporating the invention.

Referring to the drawings, there is illustrated a molded case circuit breaker 1 incorporating a magnetic trip assembly with the moving core provided therein to lower the magnetic trip point in accordance with the teachings of the present invention. While the circuit breaker 1 is depicted and described herein as a three-phase, or three-pole circuit breaker, the principles of the invention are equally applicable to single or polyphase circuit breakers, and to both ac and dc circuit breakers.

The circuit breaker 1 includes a molded, electrically insulating, top cover 8 secured to a molded, electrically insulating, bottom cover or base 6 by fasteners 34. (FIG. 2).

Referring to FIG. 1, there is shown an exemplary embodiment of the present invention wherein a set of first electrical terminals, or line terminals 9*a*, 9*b* and 9*c* are provided, one for each pole or phase. Similarly, a set of second electrical terminals, or load terminals 11*a*, 11*b* and 11*c* are provided at the other end of the circuit breaker base 6 (FIG. 2). These terminals are used to serially electrically connect circuit breaker 1 into a three-phase electrical circuit for protecting a three-phase electrical system.

Figure 8:
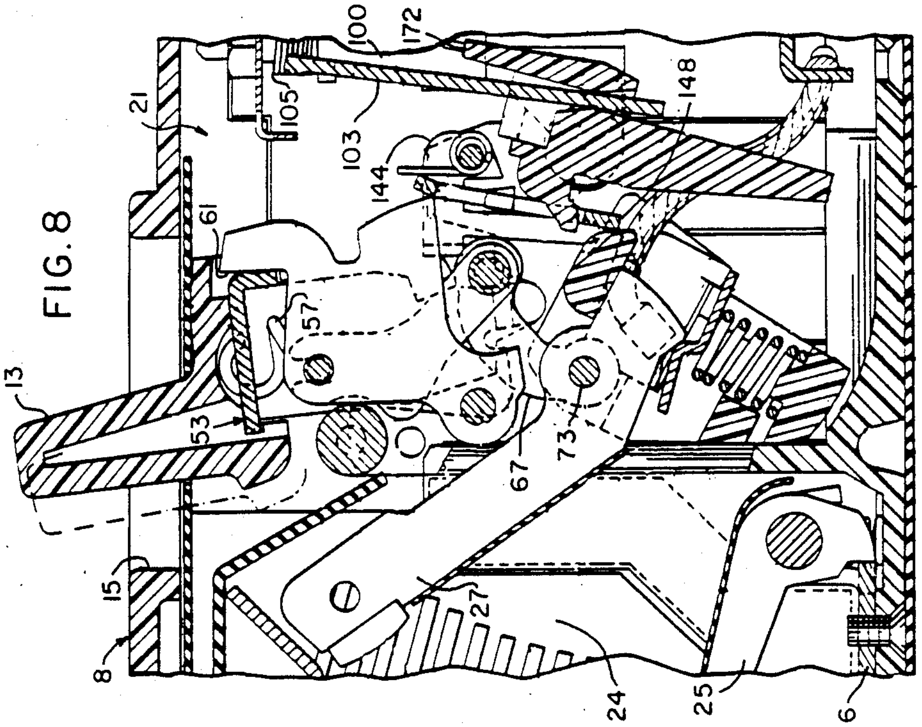
FIG. 8 is a vertical section of a portion of the circuit breaker of FIG. 1 taken along the same line as FIG. 2 but showing the magnetic trip assembly and electrical contacts for one phase of an exemplary multiphase breaker in the TRIPPED position.
Figure 7:
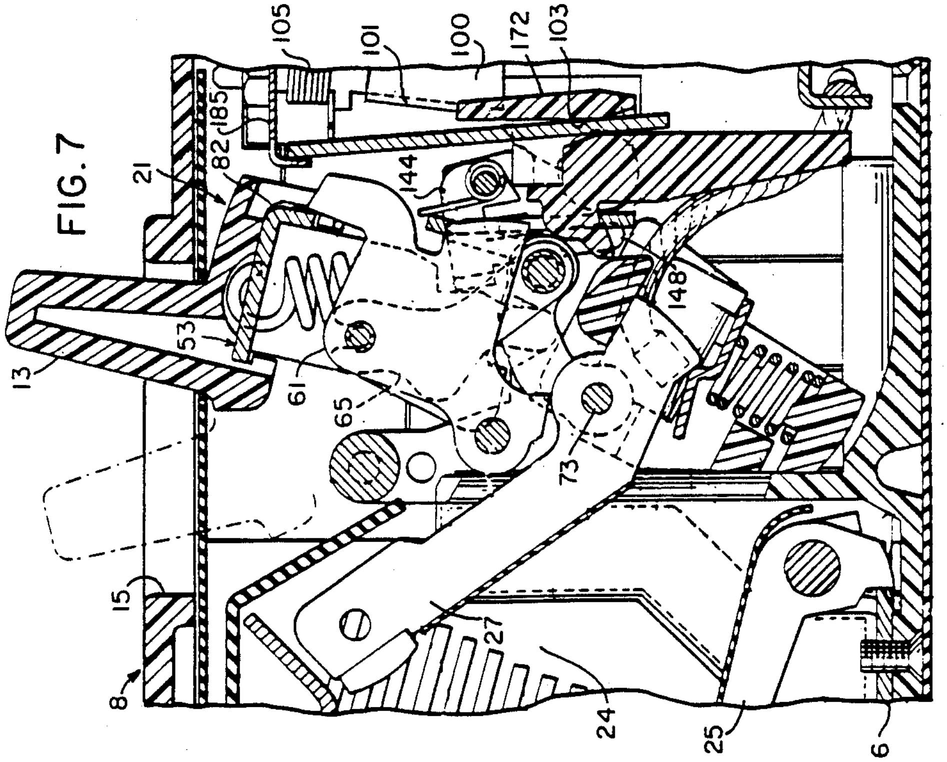
FIG. 7 is a vertical section of a portion of the circuit breaker of FIG. 1 taken along the same line as FIG. 2 but showing the magnetic trip assembly and electrical contacts for one phase of an exemplary multiphase breaker, in the OPENED position.

The circuit breaker 1 further includes an electrically insulating rigid, manually engagable handle 13 extending through an opening 15 in the top cover 3 for setting the circuit breaker to its CLOSED position (FIG. 2) or its OPEN position (FIG. 7). The circuit breaker 1 may also assume a TRIPPED position (FIG. 8). Circuit breaker 1 may be reset from the TRIPPED position to the CLOSED position for further protective operation by moving the handle 13 through the OPEN position (FIG. 7). The handle 13 may be moved either manually or automatically by an operating mechanism 21 to be described in more detail hereinbelow.

Figure 2:
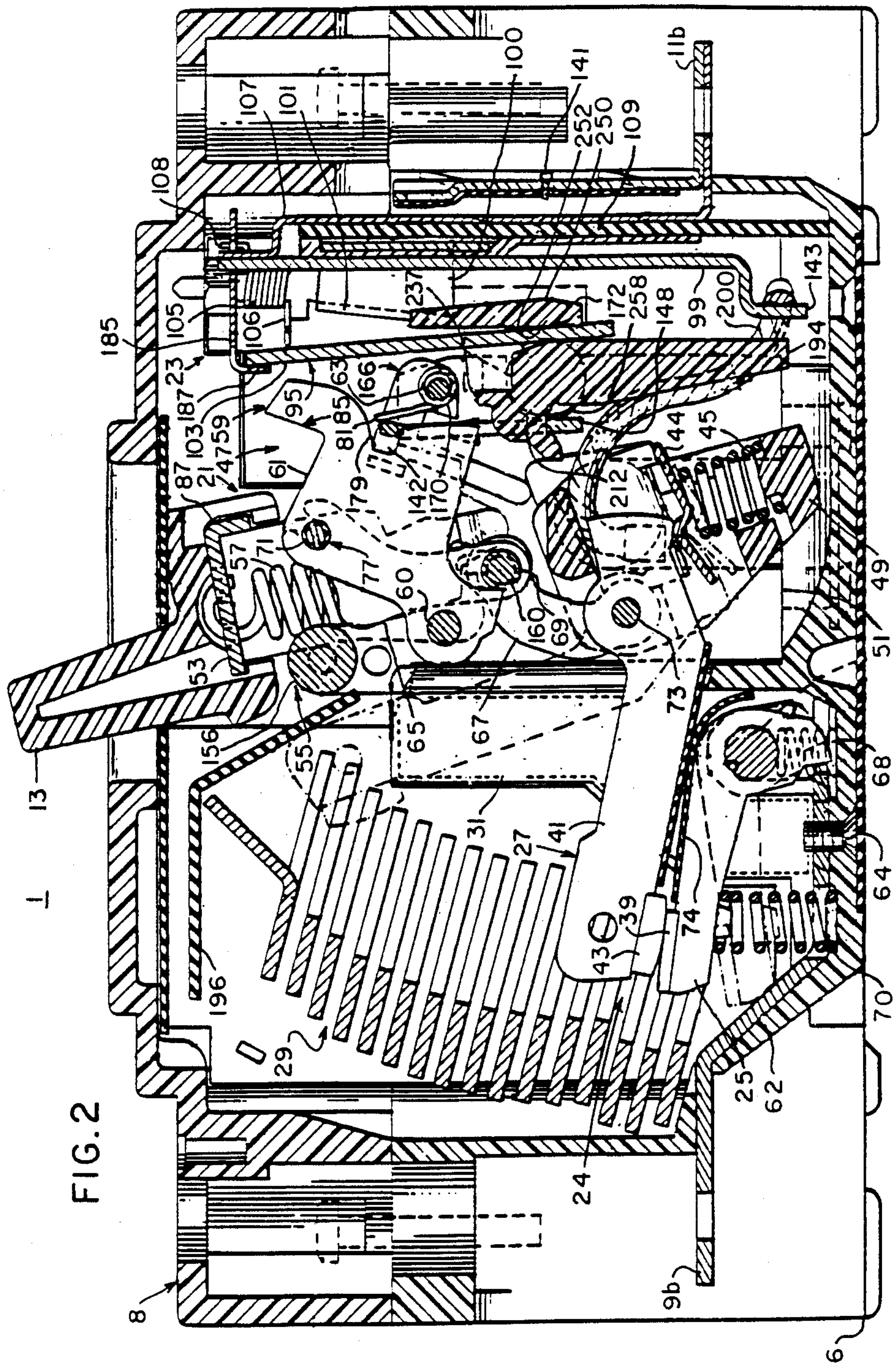
FIG. 2 is a cross-sectional view of the device of FIG. 1 taken along line 2—2 of FIG. 1.

Referring to FIG. 2, the circuit breaker 1 includes as its major components for each phase a set of electrical contacts 24 which have a lower electrical contact 25, as upper electrical contact 27, an operating mechanism 21 and a trip mechanism 23. Associated with each set of electrical contacts 24 is an electrical arc chute 29 and a slot motor 31. The arc chute 29 and the slot motor 31 are conventional, per se, and thus are not discussed in detail. Briefly, the arc chute 29 is used to divide a single electrical arc formed between separating electrical contacts 25 and 27 upon a fault condition into a series of electrical arcs, increasing the total arc voltage and resulting in a limiting of the magnitude of the fault current. The slot motor 31 consisting either of a series of generally U-shaped steel laminations encased in electrical insulation or of a generally U-shaped, electrically insulating, solid steel bar, is disposed about the contacts 25 and 27 to concentrate the magnetic field generated upon a high level short circuit or fault current condition thereby greatly increasing the magnetic repulsion forces between the separating electrical contacts 25 and 27 to rapidly accelerate their separation. The rapid separation of the electrical contacts 25 and 27 results in a relatively high arc resistance to limit the magnitude of the fault current. A more detailed description of the arc chute 29 and slot motor 31 can be found in U.S. Pat. No. 3,815,059.

The lower electrical contact 25 includes a lower, formed, stationary member 62 secured to the base 6 by a fastener 64, a lower movable contact arm 37, a pair of electrical contact compression springs 68, a lower contact biasing means or compression spring 70, a contact 39 for physically and electrically contacting the upper electrical contact 27, and an electrically insulating strip 74. The line terminal 9*b* comprises an integral end portion of the member 62. The lower electrical contact 25 utilizes the high magnetic repulsion forces generated by high level short circuit or fault current flowing through the elongated parallel portions of the electrical contacts 25 and 27 to cause the rapid downward movement of the contact arm 37 against the bias of compression spring 70. (FIG. 2). An extremely rapid separation of the electrical contacts 25 and 27 and a resultant rapid increase in the resistance across the electrical arc formed between the electrical contacts 25 and 27 is thereby achieved, providing effective fault current limitation within the confines of relatively small physical dimensions.

The upper electrical contact 27 includes a rotatable contact arm 41 and a contact 43 for physically and electrically contacting the lower electrical contact 25.

The operating mechanism 21 includes an over-center toggle mechanism 47, an integral one-piece molded cross bar 49, a pair of rigid, spaced apart, metal side plates 51, a rigid, pivotable metal handle yoke 53, a rigid stop pin 55, a pair of operating tension springs 57 and a latching mechanism 59.

The over-center toggle mechanism 47 includes a rigid, metal cradle 61 that is rotatable about the longitudinal central axis of a cradle support pin 60 journaled in the side plates 51.

The toggle mechanism 47 further includes a pair of upper toggle links 65, a pair of lower toggle links 67, a toggle spring pin 69 and an upper toggle link follower pin 71. The lower toggle links 67 are secured to either side of the rotatable contact arm 41 of the upper electrical contact 27 by toggle contact pin 73. The toggle contact pin 73 also passes through an aperture (not shown) formed through the upper electrical contact 27 enabling upper electrical contact 27 to freely rotate about the central longitudinal axis of the pin 73.

The ends of the pin 73 are received and retained in the molded cross bar 49. Thus, movement of the upper electrical contact 27, and the corresponding movement of the cross bar 49 are effected by movement of the lower toggle links 67. In this manner, movement of the upper electrical contact 27 by the operating mechanism 21 in the center pole or phase of the circuit breaker 1 simultaneously, through the rigid cross bar 49, causes the same movement in the electrical contacts 27 associated with the other poles or phases of the circuit breaker 1.

The upper toggle links 65 and lower toggle links 67 are pivotally connected by the toggle spring pins 69. The operating tension springs 57 are stretched between the toggle spring pin 69 and the handle yoke 53 such that the springs 57 remain under tension, enabling the operation of the over-center toggle mechanism 47 to be controlled by and be responsive to external movement of the handle 13.

The upper links 65 also include recesses or grooves 77 for receipt and retention of pin 71. Pin 71 passes through the cradle 61 at a location spaced by a predetermined distance from the axis of rotation of the cradle 61. Spring tension from the springs 57 retains the pin 71 in engagement with the upper toggle links 65. Thus, rotational movement of the cradle 61 effects a corresponding movement or displacement of the upper portions of the links 65.

The cradle 61 has a slot or groove 79 defining an inclined flat latch surface 142 which is configured to engage an inclined flat cradle latch surface 144 formed in the upper end of an elongated slot or aperture 81 in a generally flat intermediate latch plate 148. The cradle 61 also includes a generally flat handle yoke contacting surface 85 configured to contact a downwardly depending, elongated surface 87 formed on the upper end of the handle yoke 53. The operating springs 57 move the handle 13 during a trip operation and the surfaces 85 and 87 locate the handle 13 in the TRIPPED position (FIG. 8) intermediate the CLOSED position (FIG. 2) and the OPEN position (FIG. 7) of the handle 13, to indicate that the circuit breaker 1 has tripped.

In addition, the engagement of the surfaces 85 and 87 resets the operating mechanism 21 subsequent to a trip operation by moving the cradle 61 in a clockwise direction against the bias of the operating springs 57 from its TRIPPED position (FIG. 8) to and past its OPEN position (FIG. 5) to enable the relatching of the latching surfaces on groove 79 and in aperture 81.

Further details of the operating mechanism and its associated molded cross bar 49 can be gained from the description of the similar operating mechanism disclosed in U.S. Pat. No. 4,528,531 which is herein incorporated by reference.

The trip mechanism 23 includes the intermediate latch plate 148, a molded one-piece trip bar 172, a movable or pivotable handle yoke latch 166, a torsion spring support pin 63, a double acting torsion spring 170, an armature 103, an armature torsion spring 105, a fixed magnetic yoke 100, a moving magnetic core 101, a bimetal 99 and a terminal connector 107. The bimetal 99 is electrically connected to the terminal 11*b* through the terminal connector 107. The fixed yoke 101 physically surrounds the bimetal 99 thereby establishing a magnetic circuit, which is discussed more fully hereinafter, to provide a response to short circuit or fault current conditions.

An armature stop plate 185 has a downwardly depending edge portion 187 that engages the upper end of armature 103 to limit its movement in the counter clockwise direction. The helical armature torsion spring 105 is mounted on member 161 of yoke 100. The spring 105 has a longitudinal end formed as a spring arm 106 for biasing the upper portion of the armature 103 against movement in a clockwise direction. An opposite, upwardly disposed, longitudinal end 108 of the torsion spring 105 is disposed in one of a plurality of spaced apart apertures (not shown) formed through the upper surface of the plate 185. The spring tension of the spring arm 106 may be adjusted by positioning the end 108 of the torsion spring 105 in a different one of the apertures formed through the upper surface of the support plate 185.

Preferably, the trip bar 172 is formed as a molded, integral or one-piece trip bar 172 having a downwardly depending contact leg 194 for each pole or phase of the circuit breaker 1. In addition, the trip bar 172 includes an enlarged armature support section 250, for each pole or phase of the circuit breaker 1. Each support section 250 includes an elongated pocket 252 formed therethrough for receiving the armature 103. The armature 103 engages and rotates associated contact leg 194 of trip bar 172 in a clockwise direction upon the occurrence of a short circuit, a fault current condition or an abnormal, low level current condition.

The trip bar 172 also includes a latch surface 258 (FIG. 2) for engaging and latching a trip bar latch surface (not shown) on the intermediate latch plate 148. Movement of the trip bar 172 and corresponding movement in the latch surfaces 258 results in movement between the cradle 61 and the intermediate latch plate 148 along the surfaces 142 and 144, immediately unlatching the cradle 61 from the intermediate latch plate 148 and enabling the counterclockwise rotational movement of the cradle 61 and a trip operation of the circuit breaker 1.

Figure 3:
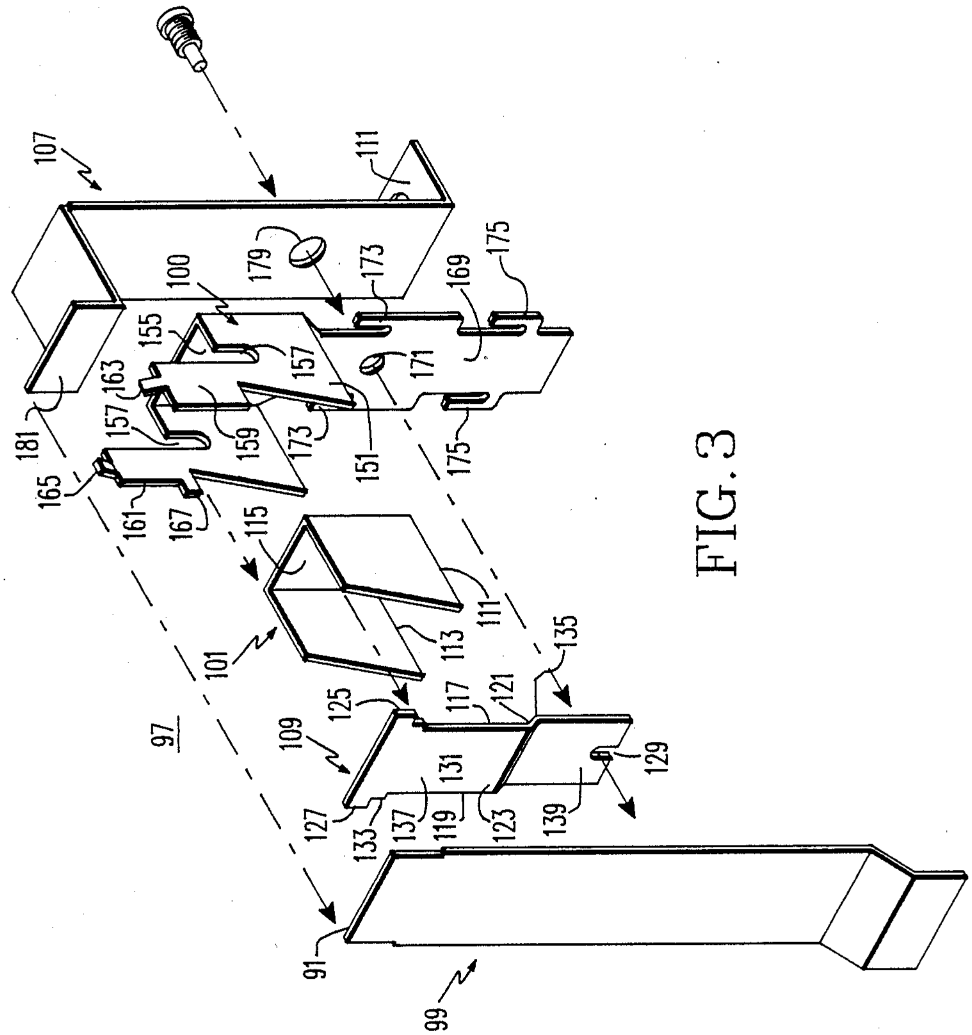
FIG. 3 is an exploded isometric view illustrating assembly of the magnetics sub-assembly including the magnetic core of the present invention.

Referring now specifically to the magnetic trip operation and the moving magnetic core of the present invention, magnetic trip assembly 95 includes magnetics sub-assembly 97 as well as armature 103 and biasing torsion spring 105 discussed hereinbefore (FIG. 2). The magnetics sub-assembly 97 is best shown in FIG. 3 which is an isometric drawing of sub-assembly 97. Magnetics subassembly 97 includes moving core 101 which is a U-shaped insert preferably comprised of steel having outwardly extending legs 111 and 113, and base 115.

Adjustment arm 109 is provided for mounting and supporting core 101 in the magnetics sub-assembly 97 while allowing the core 101 to travel back and forth as discussed hereinafter. When the magnetics sub-assembly 97 is assembled, the legs 111 and 113 of core 101 straddle sides 117 and 119, respectively, of adjustment arm 109. Core 101 rests on shoulders 121 and 123 of arm 109, and is limited in upward motion by upper shoulder 131 which is under flange 125, and upper shoulder 133 which is under flange 127 of arm 109.

Figure 4:
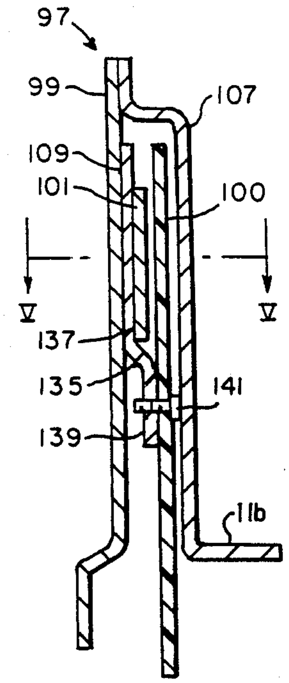
FIG. 4 is a vertical sectional view of the magnetics sub-assembly incorporating the moving core of the present invention.

Adjustment arm 109 is welded directly on to bimetal 99. (See FIG. 4.) The bimetal 99 acts as the conductive member of the magnetics sub-assembly 97. The upper surface 137 of arm 109 directly engages bimetal 99. The lower portion 139 of the adjustment arm 109 is offset at offset portion 135. The lower surface 139 of arm 109 has an aperture 129 therethrough which is adapted to receive adjustment screw 141 for adjusting the thermal trip setting as discussed more fully hereinafter.

Fixed magnetic yoke 100 is the primary magnet of the magnetics sub-assembly 97; it is preferably comprised of steel or other suitable magnetic material and it is also U-shaped, having outwardly extending legs 151 and 153 and an elongated base 155, having an extended lower portion 169.

The legs 151 and 153 of yoke 100 envelope the moving core 101 when the device is assembled. Lower portion 169 of yoke 100 has a tapped aperture 171 through which adjusting screw 141 is threaded. Lower portion 169 of the fixed yoke 100 has an upper set of flanges 173 and lower set of flanges 175 which are adapted to engage portions of the molded base 6 of circuit breaker 1.

Terminal connector 107 is a continuation of terminal 11*b*; it conducts current to bimetal 99 through its upper portion 181 which is welded to the upper section 91 of bimetal 99. The bimetal 99 includes a formed lower end 143 which is spaced by a predetermined distance from the lower end of the downwardly depending contact leg 194 of the trip bar 172 (FIG. 2). In a preferred embodiment of the invention, the spacing between the end 143 and the leg 194 may be adjusted to change the response time of the circuit breaker 1 to overload conditions by appropriately turning an adjusting screw 141. Adjusting screw 141 is threaded into aperture 171 of fixed yoke 100 and passes through opening 129 of adjustment arm 109 and engages the edge of arm 109 surrounding aperture 129. When screw 141 is tightened this moves arm 109 which is welded onto bimetal 99 which, in turn, results in a corresponding change in position of lower end 143 of bimetal 99. As mentioned, this results in a desired change in response time of the breaker to persistent low level overload conditions.

Assembly of the magnetics sub-assembly 97 of the present invention can be best understood with reference to FIG. 3. Upper portion 137 of adjustment arm 109 is welded onto bimetal 99. Movable core 101 is then placed around the center of adjustment arm 109 at sides 117 and 119. Movable core 101 rests on shoulder 121 and 123 of arm 109. The core 101 is limited in upward motion by shoulders 131 and 133 of arm 109. Terminal connector 107 is welded at its upper portion 181 to the upper portion 191 of bimetal 99. The bimetal 99, adjustment arm 109, movable core 101 and terminal connector 107 which are connected as hereinbefore discussed, are then dropped into the u-shaped portion of fixed yoke 100 such that the outwardly extending flanges 125 and 127 of arm 109 are friction fit into slots 157 of yoke 100. The entire sub-assembly 97 is then placed in circuit breaker 1 in the molded slots (not shown) adapted to receive sub-assembly 97.

With magnetics sub-assembly 97 appropriately positioned and secured in circuit breaker 1, a current carrying conductive path is established between the lower end 143 of the bimetal 99 and the upper electrical contact 27 by a flexible copper shunt 200 connected by any suitable means for example, by brazing, to the lower end 143 of the bimetal 99 and to the upper electrical contact 27 within the cross bar 49. In this manner, an electrical path is provided through the circuit breaker 1 between the terminals 9*b* and 11*b* (FIG. 2) via the lower electrical contact 25, the upper electrical contact 27, the flexible shunt 200, the bimetal 99 and the terminal connector 107.

Figure 6:
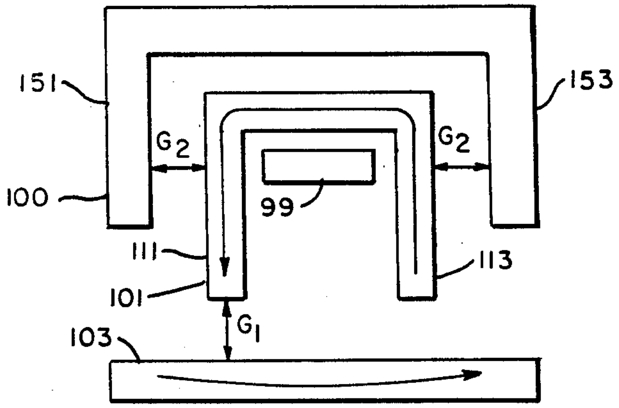
FIG. 6 is a schematic diagram of the magnetic circuit created by the elements of the magnetic trip assembly incorporating the moving core of the present invention and the armature.

The magnetic circuit which is created in magnetics sub-assembly 97 is shown schematically in FIG. 6. When the current flows through bimetal 99, a flux is generated in the magnetic circuit of FIG. 6. There is thus a magnetic attraction between core 101 and the armature 103. As mentioned above, this draws core 101 out of the yoke 100. This reduces the air gap $G_1$ between the armature 103 and the core 101. As is known to those skilled in the art, magnetic force varies inversely with the square of the length of the air gap. Magnetic force in turn varies directly with flux which is related to the square of the current. A smaller gap would mean that a substantially smaller amount of current would generate the same magnetic force which is required to overcome the biasing force of the armature. Or alternatively, a certain amount of force is required to bring the armature in to its unlatched position. This amount of force can be produced at a much lower current if $G_1$ is reduced. This gives rise to the desired result of producing a magnetic trip at lower currents.

Preferably, a secondary air gap $G_2$ is provided between the movable core 101 and the fixed yoke 100 (FIG. 6). This gap $G_2$ allows the flux to be concentrated in the direction of the armature. In addition, with gap $G_2$ surrounding the core there is essentially no friction force to be overcome between the movable core 101 and yoke 100 prior to the movable core 101 moving out into the primary air gap $G_2$.

As discussed above, when current flows through the bimetal 99, an attraction occurs between the core 101 and the armature 103, pulling core 101 out of yoke 100, reducing the air gap $G_1$ between armature 103 and core 101. After the armature 103 makes contact with core 101, the armature 103 continues to be attracted to the yoke 100. Armature 103 then drives the core 101 back into the magnet, resulting in the full travel required to unlatch operating mechanism 21 which rotates the trip bar 172 in the manner discussed hereinbefore. The moving core 101 aides in attracting armature 103 to the magnetic yoke 100 and does so at lower current levels than without the presence of core 101.

In some applications, it is desirable to have a snap action in the magnetic trip mechanism. Snap action would result if there is no secondary gap $G_2$ formed between legs 151 and 153 of yoke 100 and legs 111 and 113 of core 101, respectively. (FIG. 6). This snap action would result due to the need to overcome the lateral magnetic field building up between the core 101 and the yoke 100 as well as the need to overcome the frictional force between the core 101 and yoke 100. A larger current would be required to overcome those two forces than would be necessary with $G_2$. Once the two forces were overcome, however, a snap action would result and the armature 103 would snap back very quickly, for example, in approximately ½ cycle of AC current due to the increased current level.

Figure 5:
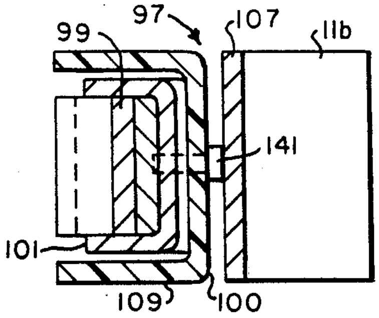
FIG. 5 is a horizontal sectional view of a magnetics assembly incorporating the moving core of the present invention, taken along lines 5—5 of FIG. 4.

FIG. 5 shows a horizontal section of the magnetics sub-assembly 97. Bimetal 99 is partially surrounded by core 101. The core 101 rests on arm 109. The core 101 is partially surrounded by stationary magnetic yoke 100. Terminal connector 107 carries current from the terminal (not shown) for one phase of the system to the sub-assembly 97.

In operation, upon the occurrence of a short circuit, a fault current, or a low level fault which has associated with it the requisite value of current, magnetic flux is generated in magnetic trip assembly 95 and magnetic yoke 100 immediately begins to attract the armature 103. At the same time, the movable core 101 of the present invention is drawn into the primary air gap $G_1$. Movable core 101 moves into primary air gap $G_1$ and thereby reduces the size of the gap. A reduction in size of the gap results in a reduction in the reluctance of the magnetic circuit. As a result, a lower level of current will produce the force required to rotate the armature to the desired unlatching position. More specifically, the armature 103 is attracted into engagement with core 101 and then urges the core 101 back into yoke 103. Ultimately the armature 103 comes into engagement with yoke 100. This movement of armature 103 results in a pivotal or rotational movement of contact leg 194 in a clockwise direction and a corresponding rotation of the trip bar 172. As discussed hereinbefore the resultant rotational movement of the contact leg 194 in a clockwise direction releases the intermediate latch plate 148 causing immediate relative movement between the cradle 61 and the intermediate latch plate 148 along inclined surfaces 142 and 144. The cradle 61 is immediately accelerated by the operating springs 57 for rotation in a counterclockwise direction (FIG. 2) resulting in the substantially instantaneous movement of the upper toggle links 65, the toggle spring pin 69 and the lower toggle links 67. The impelling surface or kicker 158 acting against the contacting surface 160 of the pin 69 rapidly accelerates the pin 69 in an upward, counterclockwise arc, resulting in a corresponding upward movement of the toggle contact pin 73 and the immediate upward movement of the upper electrical contact 27 to its TRIPPED position (FIG. 8).

Since the base portions 44 of all of the upper electrical contacts 27 are biased by the springs 45 into contact with an interior surface (not shown) formed the cross bar 49, the upper electrical contacts 27 move in unison with the cross bar 49 resulting in the simultaneous or synchronous separation of all three of the upper electrical contacts 27 from the lower electrical contacts 25 in the circuit breaker 1.

In a similar manner, a persistent low level current causes the bimetal 99 to bend bringing the formed lower end 143 into contact with and deflecting contact leg 194 on the trip bar 172 thereby rotating the trip bar 172 and tripping the circuit breaker in the manner discussed above in connecting with the magnetic trip.

Upon the occurrence of a high level short circuit or fault current condition and as a result of the large magnetic repulsion forces generated by the flow of fault current through the generally parallel contact arms 27 and 25, the electrical contacts 27 and 25 rapidly separate and move to their BLOWN-OPEN positions (depicted in dotted line form in FIG. 2). The separation of the electrical contacts 27 and 25 is achieved without the necessity of the operating mechanism 21 sequencing through a trip operation. However, the subsequent sequencing of the operating mechanism 21 through a trip operation forces the upper contact arm 41 against an electrical insulation barrier 196 and the stop 156 in the center pole or phase of the circuit breaker 1 against stops integrally formed in the top cover 8 in the outer poles or phases of the circuit breaker 1 to cause relative rotational movement between the upper electrical contact 27 and the cross bar 49, resulting in the reengagement of the interior surface (not shown) of the cross bar 49 by the base portion 44 of the upper electrical contact 27 and the resultant separation of the other electrical contacts in the other poles or phases of the circuit breaker 1.

With the circuit breaker tripped, the contacts are opened as shown in FIG. 8. The circuit breaker 1 is reset by moving the handle 13 to the OFF position as shown in FIG. 5. This rotates the cradle 61 to a position where it is biased by the latch torsion spring 170 which engages the surface 237 of the trip bar 172, causing the surface 237 to rotate counterclockwise to enable the latch surface 258 of trip bar 172 to engage and relatch with the latch surface 212 of the intermediate latch plate 148 to reset the intermediate latch plate 148, the trip bar 172 and the circuit breaker 1.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the appended claims and any and all equivalents thereof.

What is claimed is:

1. A circuit breaker for responding to abnormal currents in a conductor in an electrical system, comprising:

electrical contacts operable between a closed position in which a circuit is completed through the conductor and an open position in which the circuit through the conductor is interrupted;

a latchable operating mechanism operable to open said electrical contacts when unlatched;

a magnetic trip assembly, comprising:

an elongated conductive member through which current from said conductor flows to generate a magnetic flux;

a pivotally mounted armature rotatable about a pivot axis and having a free end rotatable toward said conductive member, said free end spaced from said conductive member in a latch position in which said armature latches said operating mechanism and which armature is attracted toward said conductive member by the magnetic flux produced by an abnormal current in said conductive member to an unlatched position which unlatches said operating mechanism;

a generally U-shaped fixed magnetic yoke having a base and two outwardly extending legs partially surrounding said conductive member with said legs extending beyond opposite sides of said conductive member toward said armature to concentrate the magnetic flux in the direction of the armature and to form a primary air gap therewith;

a generally U-shaped movable magnetic core having a base and two outwardly extending legs, the base of said movable core being adjacent the base of said fixed yoke and movable relative to said fixed yoke between an extended position and a retracted position with the legs of said movable core extending beyond the legs of said fixed yoke into said primary air gap to shorten said primary air gap between the armature and said fixed yoke in the extended position to further concentrate the magnetic flux and to generate the magnetic force required to attract the armature toward said fixed yoke at a lower current level, said movable core in the extended position is engaged by said armature as it pivotally rotates toward said fixed yoke, and said armature as it continues to rotate urges said core into said retracted position in which the legs of said movable core extend toward the armature about as far as the legs of said fixed yoke, said movable core also having means mounting said core in spaced relationship with respect to said yoke with said movable core being movable on said mounting means from said extended position to said retracted position; and biasing means biasing said armature away from said conductive member to said latching position.

2. The circuit breaker of claim 1, wherein said mounting means supports said movable core in spaced relationship to said fixed yoke defining a secondary air gap between the legs of said movable core and the legs of said fixed yoke.

3. The circuit breaker of claim 2, wherein said movable core is mounted on said mounting means between said conductive member and said fixed yoke with said fixed yoke surrounding said movable core.

4. The circuit breaker of claim 1, wherein said movable core is mounted on said mounting means between said conductive member and said fixed yoke with said fixed yoke partially surrounding said movable core with said fixed yoke in engagement with said movable core.

5. The circuit breaker of claim 1, wherein said elongated conductive member is a bimetal cantilevered from said one end thereof, said bimetal bending in response to persistent current through said conductor above a preset level to unlatch said latchable operating mechanism.

6. The circuit breaker of claim 1, wherein said mounting means comprises an adjustment arm mounted adjacent the one end of said bimetal, said adjustment arm having shoulder means thereon for supporting said movable core and allowing said movable core to travel between said extended position and said retracted position.

7. A circuit breaker for responding to abnormal currents in conductors associated with each phase in a multiphase electrical system comprising:

a set of electrical contacts for each phase of the multiphase electrical system completing an electrical circuit through an associated conductor when closed and interrupting the circuit when open;

a latchable spring powered operating mechanism operable to open all of said sets of electrical contacts when unlatched;

a trip bar rotatable from a biased position to a trip position to unlatch said operating mechanism;

a magnetic trip assembly for each phase of the multiphase electrical system each comprising:

an elongated conducting bimetal through which current from said conductor flows to generate a magnetic flux;

a pivotally mounted armature rotatable about a pivot axis and having a free end rotatable toward said bimetal, said free end spaced from said bimetal in a latch position in which said armature latches said operating mechanism, said armature is attracted towards said bimetal by the magnetic flux produced by an abnormal current in said bimetal to an unlatched position which unlatches said operating mechanism;

a generally U-shaped fixed magnetic yoke having an elongated base and two outwardly extending legs partially surrounding one end of said bimetal to concentrate the magnetic flux in the direction of said armature to concentrate the magnetic flux in the direction of the armature and to form a primary air gap therewith;

a generally U-shaped movable magnetic core having a base and two outwardly extending legs, the base of said movable core being adjacent the base of said fixed yoke and movable relative to said fixed yoke between an extended position and a retracted position with the legs of said movable core extending beyond the legs of said fixed yoke into said primary air gap to shorten said primary air gap between the armature and said fixed yoke in the extended position to further concentrate the magnetic flux and to generate the magnetic force required to attract the armature toward the bimetal at a lower current level, said core in the extended position is engaged by said armature as it pivotally rotates toward said fixed yoke, and said armature as it continues to rotate urges said movable core into said retracted position in which the legs of said movable core extend toward the armature about as far as the legs of said fixed yoke, said movable core having means mounting said movable core with said movable core being movable on said mounting means from said extended position to said retracted position; and biasing means biasing said armature away from said bimetal to said latching position.

8. The circuit breaker of claim 7, including stop means limiting pivoting of said armature away from said bimetal to a distance at which said armature remains attracted toward said bimetal by the magnetic flux produced by said current.

9. The circuit breaker of claim 8, wherein said biasing means comprises a torsion spring having a first spring arm bearing against and biasing said armature away from said bimetal, and a second spring arm engaged by said stop means.

10. The circuit breaker of claim 7, wherein said adjustment arm is generally elongated and has an upper portion having two outwardly extending flanges, a narrow center portion having a width less than the width of the base of said movable core, and a lower portion having a width greater than the width of said narrow center portion, said narrow center portion meeting said lower portion and defining a lower set of shoulders to support said movable core when it is mounted on said adjustment arm, and said upper portion meeting said narrow center portion and defining an upper set of shoulders to limit upward motion of said movable core;

11. The circuit breaker of claim 10, wherein the lower portion of said adjustment arm is offset from the narrow center portion thereof with said lower portion being in a different, but parallel plane to the plane of said narrow center portion and with said lower portion having a cut out portion therein adapted to receive an adjustment means for adjustment of the position of said bimetal by adjusting the position of said adjustment arm.

12. The circuit breaker of claim 11, wherein said adjustment arm is welded on to the one end of said bimetal, said weld being towards said upper portion of said adjustment arm.

13. The circuit breaker of claim 12, wherein said fixed yoke has slots in an upper portion of said legs thereof adapted to receive the outwardly extending flanges of said adjustment arm.

14. The circuit breaker of claim 13, in combination with an adjustment means for adjusting the position of said bimetal by adjusting the position of said adjustment arm, wherein said fixed yoke has an aperture therethrough aligned with said cut out portion of said adjustment arm for access to said adjustment means to adjust said position of said bimetal by adjustment of said adjustment arm.

* * * * *